United States Patent [19]
Cho

[11] Patent Number: 5,488,259
[45] Date of Patent: Jan. 30, 1996

[54] MOTOR MOUNT FOR AN ELECTRICAL MOTOR

[75] Inventor: Nam-Sik Cho, Seoul, Rep. of Korea

[73] Assignee: Samsung Electronics Co., Ltd., Suwon, Rep. of Korea

[21] Appl. No.: 334,077

[22] Filed: Nov. 4, 1994

[30] Foreign Application Priority Data

Dec. 11, 1993 [KR] Rep. of Korea ............... 93-23770

[51] Int. Cl.⁶ .................................................. H02K 15/14
[52] U.S. Cl. ........................................... 310/91; 310/42
[58] Field of Search .................. 310/91, 42; 248/637, 248/670

[56] References Cited

U.S. PATENT DOCUMENTS

| | | | |
|---|---|---|---|
| 2,151,561 | 3/1939 | Morrill | 29/596 |
| 3,066,898 | 12/1962 | Haynes | 248/23 |
| 3,983,429 | 9/1976 | Allardice, Jr. | 310/91 |
| 4,012,021 | 3/1977 | Duceppe | 248/23 |
| 4,116,410 | 9/1978 | Boyd, Jr. et al. | 248/26 |
| 4,726,112 | 2/1988 | King et al. | 29/596 |

FOREIGN PATENT DOCUMENTS 62-38177  9/1987  Japan .

Primary Examiner—Steven L. Stephan
Assistant Examiner—D. R. Haszko
Attorney, Agent, or Firm—Burns, Doane, Swecker & Mathis

[57] ABSTRACT

A motor mount for an electrical motor comprising a pair of identically configured supporting members each having a motor-contacting concave face. Each supporting member has parallel sides with holes formed therein to receive a fastener when holes of one supporting member are aligned with holes of the other supporting member. The supporting members are mutually adjustable to move the contact faces toward or away from one another in order to conform to different size motors.

7 Claims, 2 Drawing Sheets

MOTOR MOUNT FOR AN ELECTRICAL MOTOR

BACKGROUND OF THE INVENTION

1. Field of the Invention

The present invention relates to a motor mount apparatus for fixing a motor disposed within an electronic home appliance such as an air conditioner and the like, to a housing body.

2. Description of the Prior Art

An electronic home appliance such as an air conditioner and the like is generally provided with a motor for generating a turning effect, and a mounting apparatus has been disclosed in various shapes in order to fix the motor to the body of the electronic home appliance.

As a prior art, Japanese (U.M.) Application No. 62-38177 published on Sep. 30, 1987, is illustrated in FIGS. 1 and 2 for as fan motor 4' a fixing support structure of a fan motor for being disposed in a housing of a window type air conditioner. The air conditioner includes a fan 7' of an indoor blower mounted at the end of an output shaft 5' which extends through a quadric plate 3' forming an indoor heat exchange chamber 2' A fan 8' of an outdoor blower is mounted at the end of an output shaft 6'.

The motor mount or fixing support structure 10' for the fan motor disclosed in the Japanese Utility Model application No. Sho 62-38177 supports the fan motor 4' at both ends thereof by respective the output axes 5' and 6' and at the same time, sets up motor base plates 11' and 12' fixedly erected on a base plate of the housing 1', disposes a reinforcing member 19' between the base plates 11' and 12' for maintaining a predetermined distance therebetween. A connecting member 20' is disposed therebetween in order to maintain a predetermined distance between the fan motor 4' and the quadric plate 3'.

The motor fixing apparatus thus described in the prior art has an effect of preventing the motor base plates 11' and 12' from being deformed. However, there is an disadvantage in that the motor base plates 11' and 12' for supporting the fan motor 4' cannot be changed in shape in case a different size fan motor 4' is used in order to increase or decrease capacity in the electronic home appliance.

In other words, every motor mount 10' is manufactured separately according to the size of a respective fan motor 4'.

Accordingly, various sizes of motor mounts 10' have to be manufactured, thereby causing various problems of a lack of standardization of the plate manufacturing, decrease of productivity and increase of manufacturing cost.

Furthermore, there have been other problems in that production efficiency and productivity are decreased due excessive time spent for selection of the fixing members according to the size fit for the motor when the fan motor (hereinafter referred to as "motor") is supported to thereby fix the fixing members to the body.

SUMMARY OF THE INVENTION

The present invention has been presented to solve the aforesaid problems, and it is an object of the present invention to provide a motor mount by which various sizes of motors can be easily fixed to the body by a pair of fixing members manufactured in the same shape, thereby improving productivity and decreasing the manufacturing cost as well.

In accordance with the object of the present invention, there is provided a motor mount by which a motor mounted with protruders can be supported to thereby fix the motor to the body. The motor mount comprise a pair of fixing members formed in the same shape and diagonally disposed for sliding, so that various sizes of motors can be supportingly fixed to the body.

According to the motor fixing apparatus, the fixing members can be so slid toward or away from one another to conform to various sizes of motors.

BRIEF DESCRIPTION OF THE DRAWINGS

For a fuller understanding of the nature and objects of the invention, reference should be made to the following detailed description taken in conjunction with the accompanying drawings in which.

DETAILED DESCRIPTION OF THE PREFERRED EMBODIMENT OF THE INVENTION

Hereinafter, one embodiment of the motor fixing apparatus will be described in detail with reference to the accompanying drawings.

Figure 1:
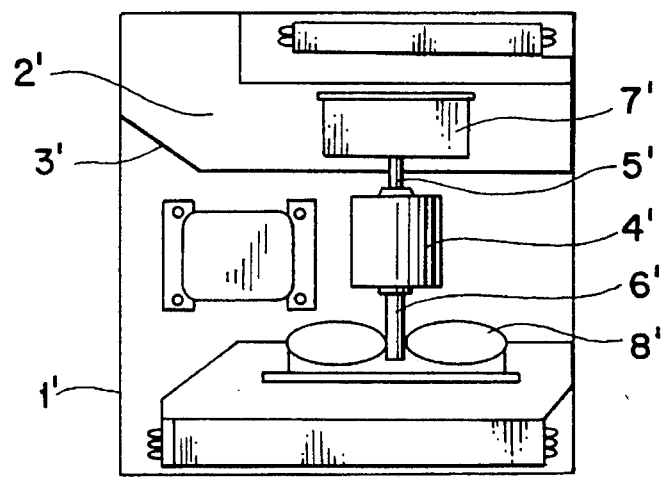
FIG. 1 is a schematic plan view for illustrating an air conditioner where a motor is fixed by a prior art fixing apparatus.
Figure 2:
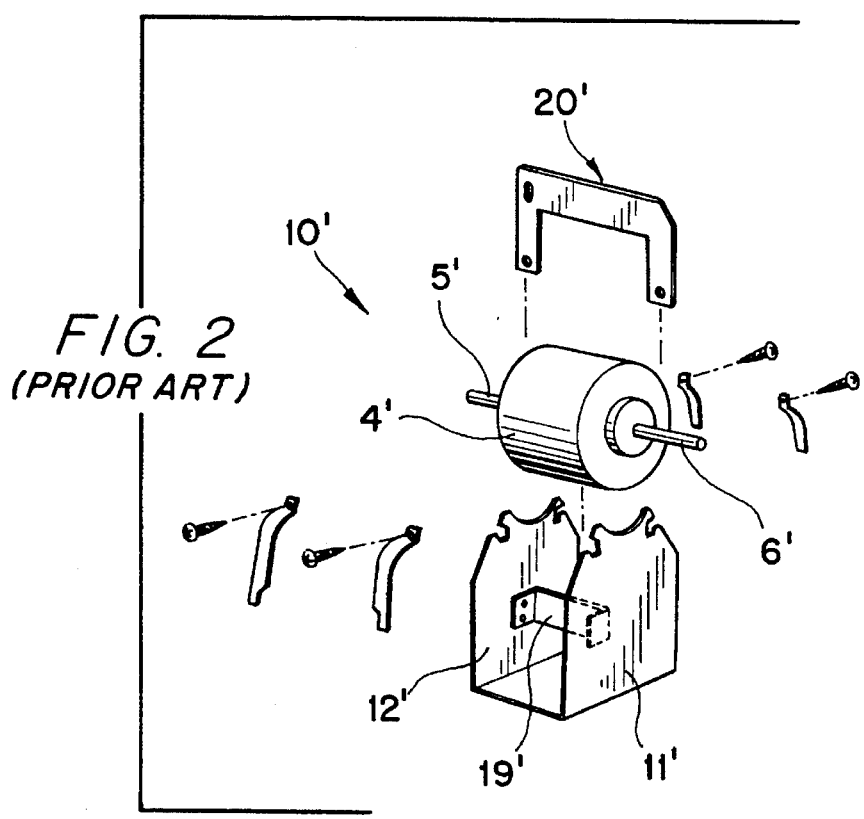
FIG. 2 is an exploded perspective view for illustrating major parts of the prior art fixing apparatus.
Figure 3:
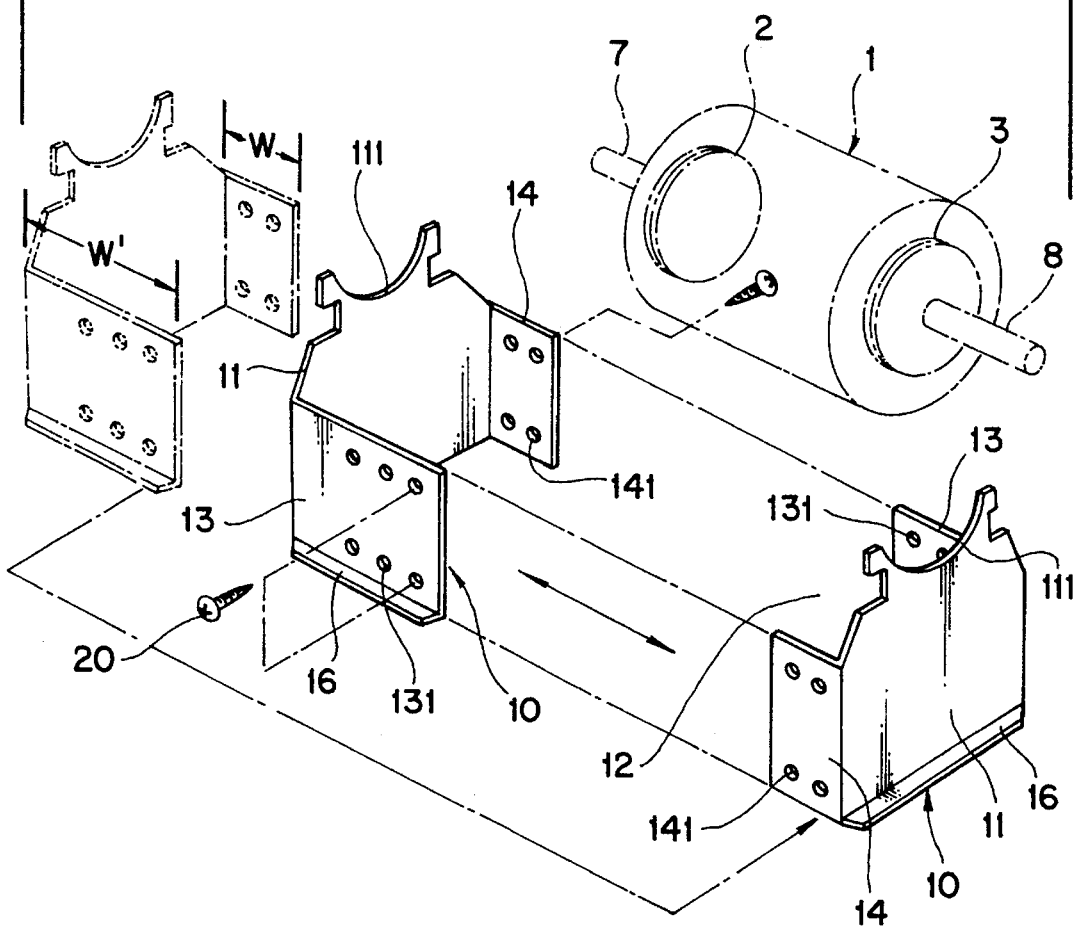
FIG. 3 is an exploded perspective view for illustrating a motor fixing apparatus (motor mount) according to the present invention.
Figure 4:
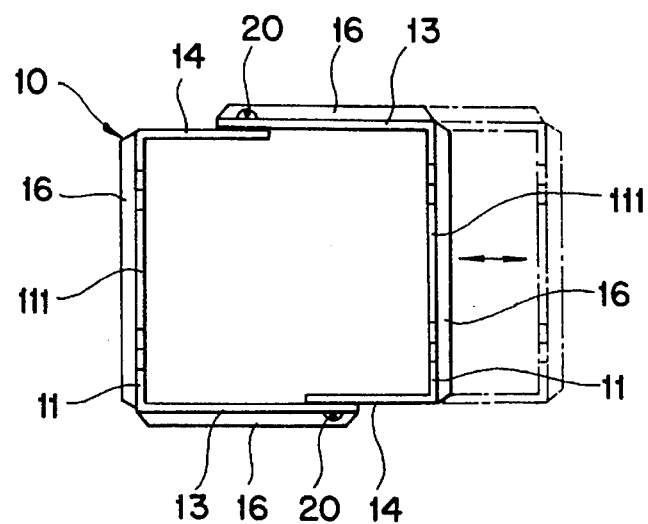
FIG. 4 is a plan view of the motor fixing apparatus according to the present invention after the apparatus has been assembled.

According to FIGS. 3 and 4, reference numeral 1 indicates a motor for generating the rotating power by way of a control signal from a control means (not shown), wherein a rotor and a stator are disposed. A first protruding unit 2 projects from one external side of the motor along with a first shaft 7 rotated by the rotor, stator and the like. A second protruding unit 3 projects from the other side along with a second axis 8 rotated by the rotor, stator and the like.

Furthermore, the motor 1 varies in its capacity according to is required capacity of the electronic home appliance such as the air conditioner, to thereby come in various sizes.

Meanwhile, reference numerals 10 indicate fixing members for attaching the motor 1 to a body (not shown). The size of the motor varies according to the capacity of the electronic home appliances. Each fixing member comprises an upright support wall 11 whose upper end forms a contact face 111 which makes surface-to-surface contact with the first protruding unit 2 or the second protruding unit 3 of the motor 1.

Furthermore, one side of the fixing member 10 is formed by bending one side of the wall 11 by approximately 90 degrees, the wall 11 including a plurality of fixing holes 131 at a predetermined distance from one another. The other side 14 of the member 10 formed by bending the other side of wall 11 at approximately 90 degrees, the side 14 having a plurality of fixed holes 141 at the same predetermined distance apart as the plurality of fixed holes 131 formed on the one side 13.

The width W of the other side 14 is narrower than the one side 13, where the support wall 11, and the sides 13 and 14 are integrally formed. A lower edge of each of the sides 14 is bent to form a surface that can be mounted on an upper surface of the body (not shown).

Reference numeral 20 is a clamping means for fastening together the paired fixing members 10 as illustrated in FIG. 4, by being inserted into the fixing holes 131 and 141.

Next, the overall operation effect of the motor fixing apparatus according to the present invention will be described with reference to the configuration thus explained.

First of all, a pair of the fixing members 10 is provided.

Then, the first protruding unit 2 of the motor 1 is mounted on the support face 111 of one of the fixing members 10.

Then, the sides 13, 14 of the fixing members 10 are slid together such that the short side 14 of each of members 10 has its outer surface situated opposite the inner surface of the long side of the other member 10. The spacing between The contact faces 111 is made to correspond to the spacing between the protrusions 2, 3 of the motor.

At this time, the motor can be easily supported by the paired fixing members 10.

Furthermore, after the motor 1 is supported by the paired fixing members 10, the clamping means 20 are inserted into suitable ones of the fixing holes 131 and 141 to thereby interconnect the paired fixing members 10.

As described above, when the motor 1 is supported and the paired fixing members fastened by the clamping means 20 is fixed to the body (not shown), the motor 1 is now fixed without any movement thereof.

The motor fixing apparatus according to the present invention provides a pair of fixing members 10 of the same shape and which can be adjusted to enable the motor 1 of various sizes to be fixed to the body (not shown).

Accordingly, fixing members 10 of the same shape can be manufactured from one mold, while enabling support and fixation of the various sizes of motors 1, so that a standardized manufacturing operation of the fixing members 10 can be made possible to thereby upgrade productivity and decrease the manufacturing cost of the same as well.

What is claimed is:

1. A motor mount for supporting a motor, comprising a pair of support members each having a contact face for supporting a portion of a motor; said support members being movable relative to one another to adjust a distance between said contact faces to adapt the motor mount to different-size motors; and fastening means for holding said support members in their adjusted positions; each support member comprising an upright wall having opposite sides thereof bent to a parallel relationship such that each upright wall includes an upright support portion, and two upright parallel side portions extending from said support portion; said support portion defining said contact face; said pair of support members being of identical construction to one another.

2. The motor mount according to claim 1, wherein each contact face is of concave shape.

3. The motor mount according to claim 1, wherein said side portions of one supporting member are arranged parallel to, and adjacent to, respective sides of the other supporting member and are slidable relative thereto in a direction perpendicular to said support portions.

4. The motor mount according to claim 3, wherein one of the side portions of a first of the supporting members has an inner surface thereof arranged to face an outer surface of one side portion of the second supporting member, and the other side portion of said first supporting member has an outer surface arranged to face an inner surface of the other side portion of said second supporting member.

5. The motor mount according to claim 3, wherein each of said side portions includes holes, said fastening means being insertable through aligned pairs of said holes.

6. The motor mount according to claim 1, wherein one of said side portions of each supporting member is of greater width than the other side portion of the supporting member, said width being measured in a direction away from the respective support portion.

7. The motor mount according to claim 6, wherein a lower portion of the wider side portion is bent horizontally.

\* \* \* \* \*